United States Patent
Horiguchi et al.

(10) Patent No.: US 9,121,731 B2
(45) Date of Patent: Sep. 1, 2015

(54) ENCODER HAVING A SCALE WITH TWO AREAS IN WHICH AN INCREASING DIRECTION OF THE AMPLITUDE OF THE ENERGY DISTRIBUTION IS OPPOSITE BETWEEN THE TWO AREAS FOR PRECISELY OBTAINING A POSITION OF THE SCALE

(75) Inventors: Haruhiko Horiguchi, Tokyo (JP); Chihiro Nagura, Yokohama (JP)

(73) Assignee: CANON KABUSHIKI KAISHA (JP)

(*) Notice: Subject to any disclaimer, the term of this patent is extended or adjusted under 35 U.S.C. 154(b) by 279 days.

(21) Appl. No.: 13/444,934

(22) Filed: Apr. 12, 2012

(65) Prior Publication Data
US 2012/0261561 A1    Oct. 18, 2012

(30) Foreign Application Priority Data
Apr. 14, 2011  (JP) .................................. 2011-089728

(51) Int. Cl.
*G01D 5/34* (2006.01)
*G01D 5/26* (2006.01)
*G01D 5/347* (2006.01)

(52) U.S. Cl.
CPC ............ *G01D 5/262* (2013.01); *G01D 5/34746* (2013.01); *G01D 5/34784* (2013.01)

(58) Field of Classification Search
CPC . G01D 5/262; G01D 5/34746; G01D 5/2457; G01D 5/2455
USPC ...... 250/231.13, 231.16, 231.18, 214 R, 221; 341/9, 13

See application file for complete search history.

(56) References Cited

U.S. PATENT DOCUMENTS

| | | | |
|---|---|---|---|
| 4,291,976 A | 9/1981 | McMahon | |
| 5,069,547 A | 12/1991 | Huggins et al. | |
| 5,699,058 A * | 12/1997 | Yanagisawa et al. | ........... 341/13 |
| 5,889,280 A | 3/1999 | Matsuura | |

(Continued)

FOREIGN PATENT DOCUMENTS

| | | |
|---|---|---|
| DE | 102007025238 A1 | 12/2007 |
| EP | 2093543 A2 | 8/2009 |

(Continued)

OTHER PUBLICATIONS

European Extended Search Report issued in application No. EP12163894.4, dated Jul. 23, 2014. Cited in related U.S. Appl. No. 13/446,587.

(Continued)

*Primary Examiner* — Que T Le
(74) *Attorney, Agent, or Firm* — Rossi, Kimms & McDowell LLP

(57) ABSTRACT

An encoder includes a scale that includes a pattern row, a detector array, and a signal processor. The pattern row has a plurality of different modulation periods in the moving direction, an amplitude of the energy distribution in the pattern having at least one modulation period being configured to change with a position of the scale in the moving direction. The signal processor acquirers an amplitude of an energy distribution of a corresponding modulation period based on an output signal from the detector array, and an amplitude signal obtained by normalizing a plurality of amplitudes obtained by the plurality of amplitude acquirers, the amplitude signal serving as a position signal representative of the position of the scale.

15 Claims, 7 Drawing Sheets

(56) References Cited

U.S. PATENT DOCUMENTS

| | | | |
|---|---|---|---|
| 6,707,029 | B1 | 3/2004 | Fuwa |
| 6,765,195 | B1 | 7/2004 | Leviton |
| 8,188,420 | B2 | 5/2012 | Lee |
| 8,309,906 | B2 * | 11/2012 | Kapner et al. ........... 250/231.16 |
| 2001/0011699 | A1 | 8/2001 | Aoki |
| 2002/0014581 | A1 | 2/2002 | Yamamoto et al. |
| 2007/0278392 | A1 | 12/2007 | Toh et al. |
| 2011/0266424 | A1 | 11/2011 | Kawatoko et al. |
| 2011/0304482 | A1 | 12/2011 | Kapner et al. |
| 2012/0261562 | A1 | 10/2012 | Nagura |
| 2012/0262731 | A1 | 10/2012 | Nagura |
| 2012/0265484 | A1 | 10/2012 | Nagura |

FOREIGN PATENT DOCUMENTS

| | | | |
|---|---|---|---|
| EP | 2511669 | A2 | 10/2012 |
| JP | 55030603 | A | 3/1980 |
| JP | 63063916 | A | 3/1988 |
| JP | 63063917 | A | 3/1988 |
| JP | 63065315 | A | 3/1988 |
| JP | 63065316 | A | 3/1988 |
| JP | 01229905 | A | 9/1989 |
| JP | 0295203 | A | 4/1990 |
| JP | 09196705 | A | 7/1997 |
| JP | 2007-248359 | A | 9/2007 |
| JP | 2009198318 | A | 9/2009 |

OTHER PUBLICATIONS

European Extended Search Report issued in European counterpart application No. EP12163898.5, dated Jul. 23, 2014.
European Extended Search Report issued in application No. EP12163893.6, dated Jul. 23, 2014. Cited in related U.S. Appl. No. 13/446,057.
European Extended Search Report issued in application No. EP12163899.3, dated Jul. 23, 2014. Cited in related U.S. Appl. No. 13/446,153.
Official Action issued in JP2011-089728, mailed Feb. 3, 2015.
Official Action issued in JP2011-089795, mailed Feb. 3, 2015.
Official Action issued in JP2011-089745, mailed Jan. 20, 2015.
Office Action issued in U.S. Appl. No. 13/446,057, mailed Apr. 9, 2014.
Office Action issued in U.S. Appl. No. 13/446,057, mailed Sep. 3, 2014.
Office Action issued in U.S. Appl. No. 13/446,057, mailed Dec. 31, 2014.
Office Action issued in U.S. Appl. No. 13/446,153, mailed Sep. 29, 2014.
Notice of Allowance issued in U.S. Appl. No. 13/446,587, mailed Jan. 13, 2015.
Office Action issued in U.S. Appl. No. 13/446,587, mailed Apr. 4, 2014.
Notice of Allowance issued in U.S. Appl. No. 13/446,587, mailed Sep. 15, 2014.

* cited by examiner

ENCODER HAVING A SCALE WITH TWO AREAS IN WHICH AN INCREASING DIRECTION OF THE AMPLITUDE OF THE ENERGY DISTRIBUTION IS OPPOSITE BETWEEN THE TWO AREAS FOR PRECISELY OBTAINING A POSITION OF THE SCALE

BACKGROUND OF THE INVENTION

1. Field of the Invention

The present invention relates to an encoder.

2. Description of the Related Art

Japanese Patent Laid-Open No. ("JP") 2007-248359 discloses an absolute encoder configured to output a monotonously increasing or decreasing signal as a scale moves. The absolute encoder including the scale having an optical pattern that combines a stripe pattern with a triangular pattern. Since a light receiving amount of a light receiving element continuously changes with the position of the scale, an analog signal is converted into absolute position information.

However, JP 2007-248359 causes detection errors because the light receiving amount of the light receiving element fluctuates due to the fluctuation of the emitted light amount of the light source and the uneven in-plane reflectance or transmittance. In addition, an apparatus is likely to become large because it requires a monitoring light receiving element and a reference pattern so as to correct a light amount.

SUMMARY OF THE INVENTION

The present invention provides a small encoder that can precisely detect a position.

An encoder according to one aspect of the present invention includes a scale that includes a pattern row that has a plurality of patterns configured to spatially modulate an energy distribution, a detector array that includes a plurality of detectors that are configured to detect the energy distribution from the pattern row and arranged in a moving direction, the detector array being configured to move relatively to the scale, and a signal processor configured to process and convert into positional information, an output signal from the detector array. The pattern row has a plurality of different modulation periods in the moving direction, an amplitude of the energy distribution in the pattern having at least one modulation period being configured to change with a position of the scale in the moving direction. The signal processor includes a plurality of amplitude acquirers each configured to acquire the amplitude of the energy distribution of a corresponding modulation period based on the output signal from the detector array, and a positional information acquirer configured to acquire an amplitude signal obtained by normalizing a plurality of amplitudes obtained by the plurality of amplitude acquirers, the amplitude signal serving as a position signal representative of the position of the scale.

Further features of the present invention will become apparent from the following description of exemplary embodiments with reference to the attached drawings.

DESCRIPTION OF THE EMBODIMENTS

Figure 1:
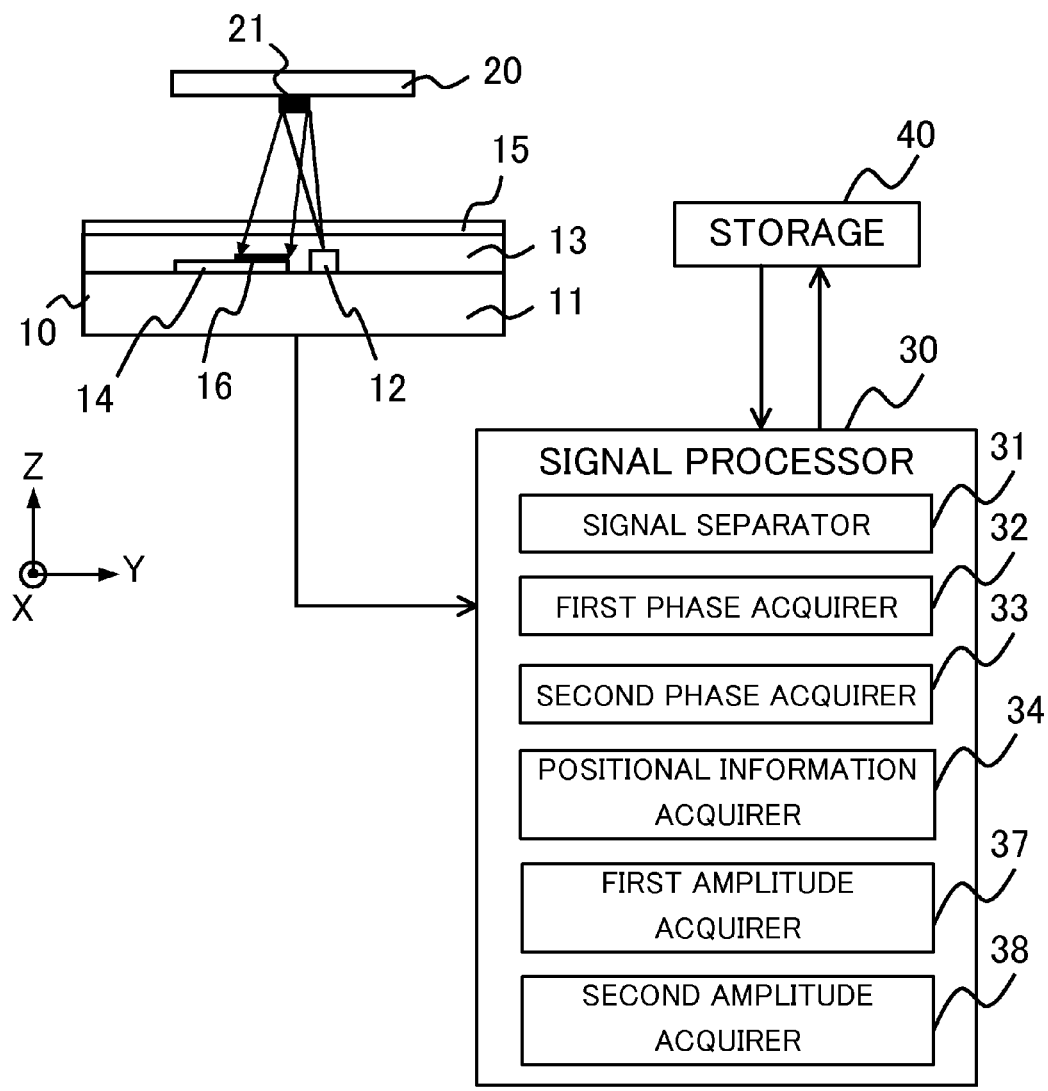
FIG. 1 is a block diagram of an encoder according to first and second embodiments.

FIG. 1 is a block diagram of an optical encoder according to this embodiment. The encoder includes a sensor unit 10 attached to a fixed unit, a scale 20 attached to a movable unit, a signal processor 30, and a storage 40. The relationship between the fixed unit and the movable unit may be reversed, as long as the sensor unit 10 and the scale 20 are configured to move relatively to each other.

The sensor unit 10 is an integrated sensor unit of a light receiving unit and a light emitting unit, which includes a printed circuit board 11, a light source 12 mounted on the printed circuit board 11, a light receiving IC 14, resin 13 used to seal the light source 12 and the light receiving IC 14 on the printed circuit board 11, and a transparent glass substrate 15 provided on the resin 13.

The light source 12 includes, for example, a light emitting diode ("LED"). The light receiving IC 14 includes a light receiving element array 16 that includes a plurality of light receiving elements. The light receiving element array 16 serves as a detector array that includes a plurality of detectors configured to detect the energy distribution from the pattern of the scale 20 and arranged in an X direction as a moving direction (length measuring direction) of the scale 20 (or the movable unit). The energy is light in this embodiment, but as described later, the energy type is not limited to the light and may be include magnetism and electricity.

The scale 20 has a track 21, which is patterned as a pattern row. The pattern row has a plurality of patterns made of a chromium reflective film on the glass substrate. The pattern is a pattern used to spatially modulate the energy distribution.

Each track 21 includes a plurality of areas, which are periodically arranged in a Y direction perpendicular to the X direction and have different pitches (modulation periods) in the X direction. A "pitch" (modulation period), as used herein, means a space period of the patterns formed in a track in the X direction. The pitch (modulation period) is a reciprocal of a spatial frequency (or a value proportioned to the reciprocal). For example, when there are two types of areas, a first area has a first pitch (first modulation period) in the X direction, and a second area has a second pitch (second modulation period) in the X direction. In this embodiment, an amplitude of the energy distribution of at least one of the plurality of areas (which corresponds to a width of the pattern in the Y direction in this embodiment) changes with a position in the X direction.

The light receiving element array 16 in this embodiment receives light reflected on the pattern of the scale 20, but this embodiment is applicable to a case where the light receiving element array 16 receives transmitted light through the pattern of the scale 20. In other words, it is sufficient that the light receiving element array 16 receives the light from the pattern of the scale 20.

The signal processor 30 processes an output signal of the light receiving element array 16 in the sensor unit 10, and converts it into positional information. The signal processor 30 also performs interpolation processing to an encoder signal obtained by the sensor unit 10, and writing and reading of the signal for the storage 40.

The signal processor 30 includes a noise filter (not illustrated), an amplifier (not illustrated), an A/D converter (not illustrated), a signal separator 31, first phase acquirer 32, a second phase acquirer 33, a positional information acquirer 34, a first amplitude acquirer 37, and a second amplitude acquirer 38. Depending upon embodiments, the second phase acquirer 33 may be omitted.

The signal separator 31 serves to separate an output from the light receiving element array 16 into a signal corresponding to each area of the track 21. The signal separator 31 sends a signal used to switch a connection of a switching circuit, if any, in the light receiving IC 14, or separates the signal using a fast Fourier transformation ("FFT") when the light receiving IC 14 has no switching circuit. Alternatively, the signal separator 31 may separate the signal by providing light receiving elements having different light receiving surfaces for the pattern pitches of the light receiving element array 16.

The first phase acquirer 32 acquires a (first) phase of the energy distribution of the first area by performing an arc tangent operation for an output (digital) signal from the light receiving element array (corresponding to the first area). The first phase acquirer 32 may serve as a relative position signal acquirer, which will be described later.

The second phase acquirer 33 acquires a (second) phase of the energy distribution of the second area by performing an arc tangent operation for an output (digital) signal from the light receiving element array 16 (corresponding to the second area).

The plurality of amplitude acquirers, such as the first amplitude acquirer 37 and the second amplitude acquirer 38, obtain corresponding amplitudes.

The first amplitude acquirer 37 acquires a (first) amplitude of the energy distribution for the first area by performing a square root operation for a sum of squares of the (digital) output signal from the light receiving element array 16 (corresponding to the first area).

The second amplitude acquirer 37 acquires a (second) amplitude of the energy distribution for the second area by performing a square root operation for a sum of squares of the (digital) output signal from the light receiving element array 16 (corresponding to the second area).

When the track 21 contains an area having a third pitch, a third phase acquirer and a third amplitude acquirer may be provided accordingly.

The positional information acquirer 34 acquires positional information of the scale 20. The positional information acquirer 34 may include a relative position information acquirer configured to acquire a relative position signal representative of a relative position of the scale 20 and an absolute position information acquirer configured to acquire an absolute position signal representative of an absolute position of the scale 20.

In this embodiment, the positional information acquirer 34 acquires, as a position signal representative of a position of the scale 20, an amplitude signal obtained by normalizing (converting into dimensionless quantity) the plurality of amplitudes acquired by the plurality of amplitude acquirers. Using the normalization can reduce influences of the fluctuations of the light amount emitted from the light source 12 and the uneven reflective factors among the plurality of amplitudes.

For example, when there are two amplitudes, such as the first amplitude obtained by the first amplitude acquirer 37 and the second amplitude obtained by the second amplitude acquirer 38, the normalization can use a ratio between these two amplitudes. The ratio between these two amplitudes may be a value of the second amplitude divided by the first amplitude (or its reciprocal) but may be another value, such as a difference between the first amplitude and the second amplitude divided by a sum of the first amplitude and the second amplitude (or its reciprocal).

When there are three amplitudes, such as the first amplitude, the second amplitude, and the third amplitude, the normalization can use a value made by dividing a difference between the first amplitude and the second amplitude by the third amplitude (or its reciprocal). Even in this case, the amplitude is converted into a dimensionless amount, and influences of the fluctuations of the light amount emitted from the light source 12 and the uneven reflective factors among the plurality of amplitudes can be reduced.

In operation, a divergent light flux emitted from the light source 12 in the sensor unit 10 is irradiated onto the track 21 of the scale 20, and the light flux reflected on the track 21 is received by the light receiving element array 16 in the sensor unit 10. The light receiving element array 16 receives an image in which a reflective index distribution of the track 21 is magnified twice. The light flux received by the light receiving element array 16 is converted into an electric signal, and sent as an encoder signal to the signal processor 30. The signal processor 30 converts the output from the light receiving element array 16 into positional information, and precisely obtains and outputs the information of the position of the scale 20.

First Embodiment

Figure 2:
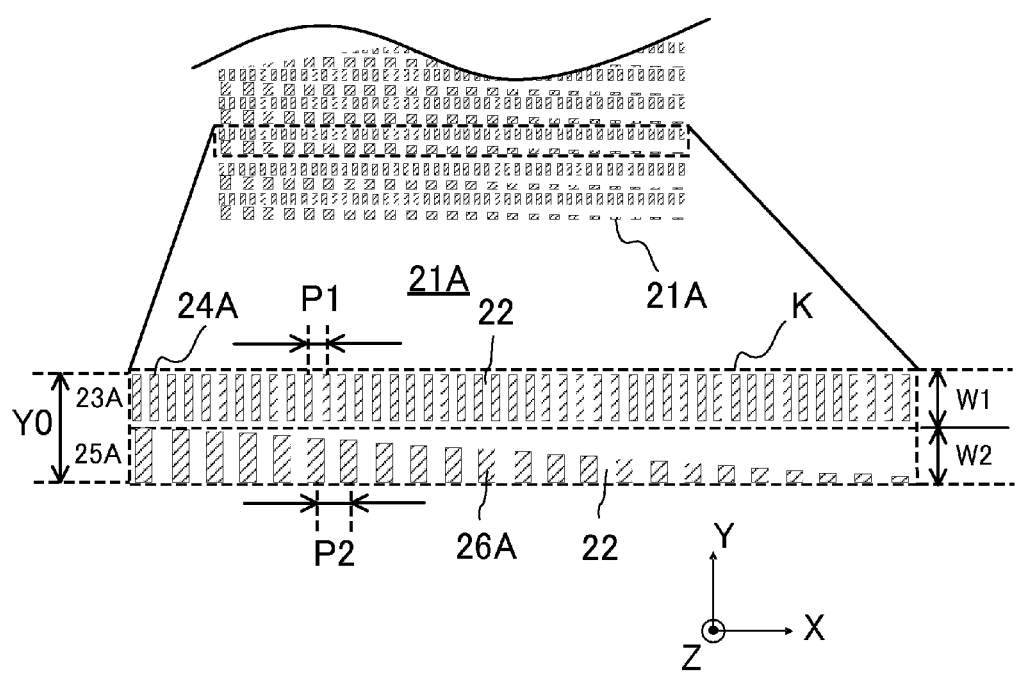
FIG. 2 is a partially enlarged plane view of a track according to the first embodiment.

FIG. 2 is a partially enlarged plane view of a track 21A applicable to the track 21 illustrated in FIG. 1 according to a first embodiment. In the track 21A, two types of areas (23A and 25A) alternate in the Y direction perpendicular to the moving direction (X direction) of the scale 20, and the unit block pattern K has a width Y0 of 50 μm in the Y direction. In FIG. 2, a white portion is a non-reflector 22 configured to transmit or absorb the light. A magnified range at the bottom in FIG. 2 corresponds to one track.

The area 23A corresponds to the aforementioned first area, and includes a pattern row having a plurality of patterns with the same rectangular shape. Each pattern is a reflector 24A that has a width of 50 μm in the X direction, and a length of 25 μm in the Y direction. A plurality of patterns are arranged at regular intervals of a pitch P1 (=100 μm) in the X direction. The pitch P1 serves as the aforementioned first modulation period. A width of the area 23A in the Y direction is set to W1=25 μm.

The area 25A corresponds to the aforementioned second area, and includes a pattern row having a plurality of rectangular patterns. Each pattern is a reflector 26A that has a width of 100 μm in the X direction, and its length in the Y direction gradually decreases in the X direction. The width of the reflector 26A in the Y direction linearly decreases with a position in the X direction so that it is 25 μm at one end of the moving range in the X direction and 0 μm at the other end thereof. A plurality of patterns are arranged at regular intervals of a pitch P2 (=200 µm) in the X direction. The pitch P2 serves as the aforementioned second modulation period. A width of the area 25A in the Y direction is set to W2=25 µm.

The values of the pitches P1 and P2 in the pattern of this embodiment are merely illustrative and not limited to this embodiment. A ratio between the pitches of the two areas may be or slightly shift from a value integer times as many as the value of this embodiment.

Figure 3A:
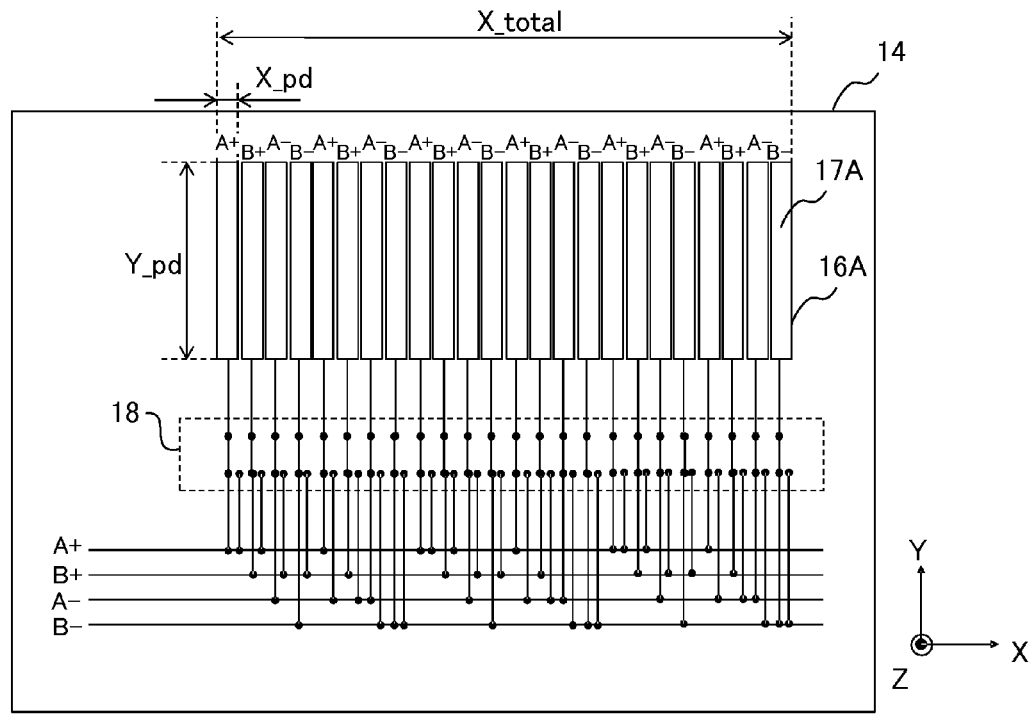
FIGS. 3A and 3B are plane views of a light receiving surface of a light receiving element array according to the first embodiment.
Figure 3B:
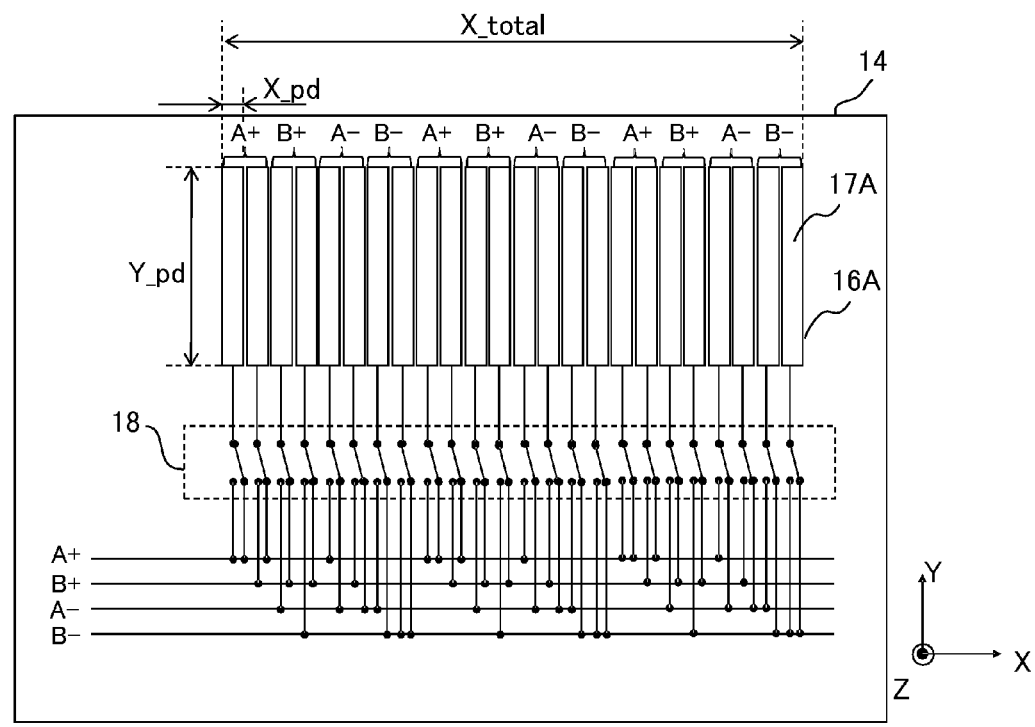

FIGS. 3A and 3B are plane views of the light receiving surface of a light receiving element array 16A applicable to the light receiving element array 16 illustrated in FIG. 1 according to this embodiment. In the light receiving element array 16A, twenty-four light receiving elements 17A are arranged in the X direction with a pitch of 50 µm: One light receiving element 17A has a width X_pd of 50 µm in the X direction, and a width Y_pd of 800 µm in the Y direction. An overall width X_total of the light receiving element 16A is 1,200 µm.

Since the projected pattern on the scale is magnified twice, the detectable range on the scale is 400 µm in the Y direction and 600 µm in the X direction. Hence, the detectable range on the scale contains eight lines in the Y direction, and each line includes the area 23A with a pitch of 100 µm in the position detecting direction and the area 25A with a pitch of 200 µm.

An output from each light receiving element 17A is switched by a switching circuit 18, and selectively connected to the four subsequent preamplifiers. The switching circuit 18 can switch a connection between the light receiving element 17A and the output terminal on the basis of the input from the signal separator 31 in the signal processor 30. As a result, an electrically added interval is switched in the plurality of light receiving elements 17A.

When the input from the signal processing circuit 30 has a high level, every fourth light receiving element 17A is connected electrically to the same preamplifier, as illustrated in FIG. 3A. The scale pattern has a detectable pitch of 100 µm (reflected image period of 200 µm), and can be used to separate and detect the area 23A (P1=100 µm).

When the input from the signal processing circuit 30 has a low level, every eighth light receiving element 17A is electrically connected electrically to the same amplifier, as illustrated in FIG. 3B. The scale pattern has a detectable pitch of 200 µm (reflected image period of 400 µm), and can be used to separate and detect the area 25A (P2=200 µm).

Figure 4:
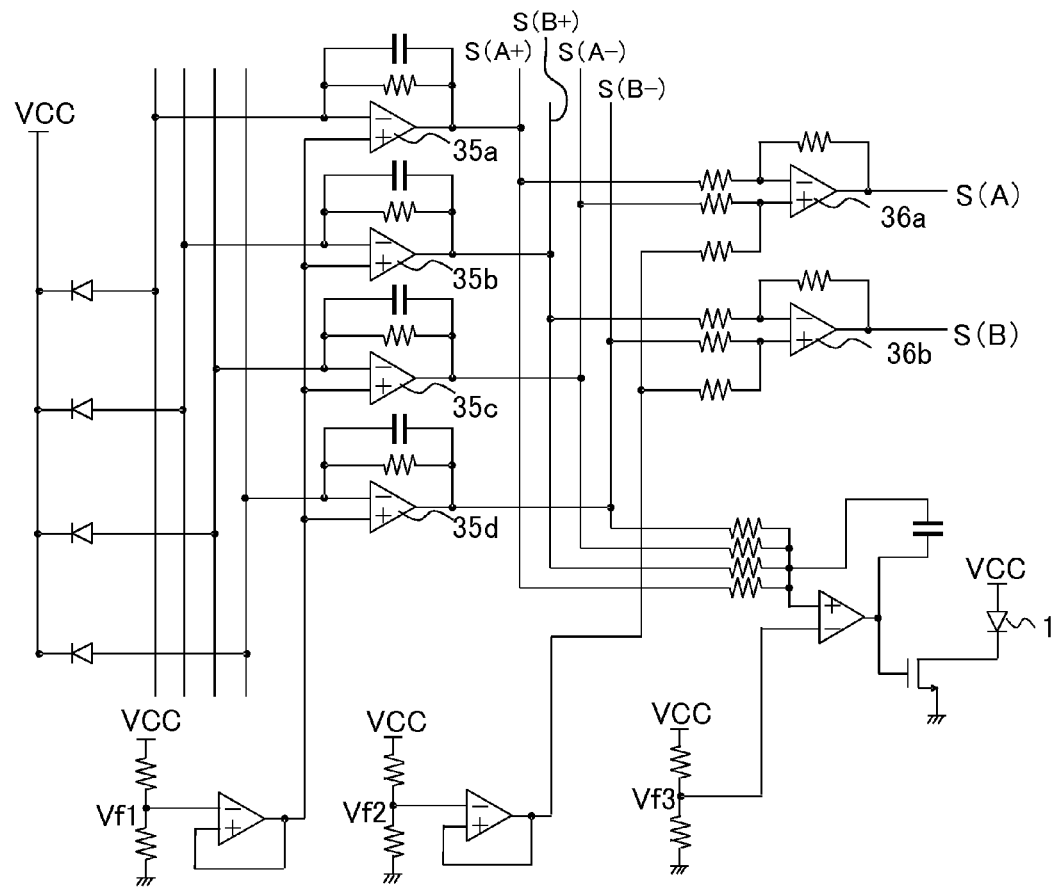
FIG. 4 is a circuitry diagram of a signal processor of the light receiving element array according to the first embodiment.

FIG. 4 is a circuitry diagram of the signal processor configured to process an output from the light receiving element array 16A. As illustrated in FIG. 4, the signal processor includes four I/V converting amplifiers 35a to 35d as preamplifiers used to generate four-phase sine wave outputs S(A+), S(B+), S(A−), and S(B−). The preamplifier may be provided to the light receiving IC 14 or signal processor 30.

Relative phases of the four-phase sine wave signals have the following relationship with S(A+) as a reference: S(B+) shifts by about +90°, S(A−) shifts by about +180° and S(B−) shifts by about +270°.

The signal processor 30 includes an A-phase differential amplifier 36a and a B-phase differential amplifier 36b, and generates two-phase sine wave signals S(A) and S(B) in which a DC component is eliminated, by performing the following operations with the four-phase sine wave outputs S(A+), S(B+), S(A−), and S(B−):

$$S(A)=S(A+)-S(A-) \qquad \text{Expression 1}$$

$$S(B)=S(B+)-S(B-) \qquad \text{Expression 2}$$

The first phase acquirer 32 in the signal processor 30 obtains a phase (signal) Φ1 of the energy distribution for the area 23A using the following operation and S(A) and S(B) when the input to the switching circuit 18 has a high level. ATAN2[Y, X] is an arc tangent function that determines a quadrant and converts it into a phase between 0 and 2π. The first amplitude acquirer 37 in the signal processor 30 obtains a first amplitude amp1 using the following expression. SQRT [X] is a function that operates a square root.

$$\Phi 1=\text{ATAN2}[S(A),S(B)] \qquad \text{Expression 3}$$

$$\text{amp1}=\text{SQRT}[S(A)^2+S(B)^2] \qquad \text{Expression 4}$$

Similarly, the second phase acquirer 38 in the signal processor 30 obtains a second amplitude amp2 using the following operation and S(A) and S(B) when the input to the switching circuit 18 has a low level:

$$\text{amp2}=\text{SQRT}[S(A)^2+S(B)^2] \qquad \text{Expression 5}$$

Moreover, the absolute position signal acquirer of the positional information acquirer 34 in the signal processor 30 obtains an amplitude signal S_amp as follows:

$$S\_amp=\text{amp2}/\text{amp1} \qquad \text{Expression 6}$$

Calculating a ratio between the first amplitude amp1 of the area 23A and the second amplifier amp2 of the area 25A can reduce influences of the fluctuations of the light amount emitted from the light source 12 and the uneven reflective factors due to the non-uniformity of the reflective films.

Figure 5A:
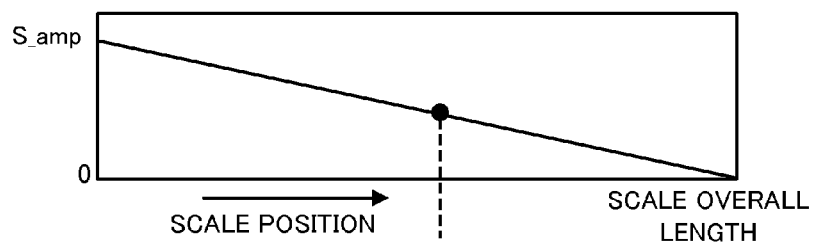
FIGS. 5A and 5B illustrate a relationship among an amplitude signal, a phase signal, and a scale position according to the first embodiment.

FIG. 5A illustrates a relationship between the amplitude signal S_amp and the scale position. The amplitude signal S_amp approximately linearly or monotonously decreases with the scale position, and becomes 0 at the scale end. The storage 40 previously stores a relationship between the amplitude signal S_amp and the position of the scale 20 in the X direction.

Figure 5B:
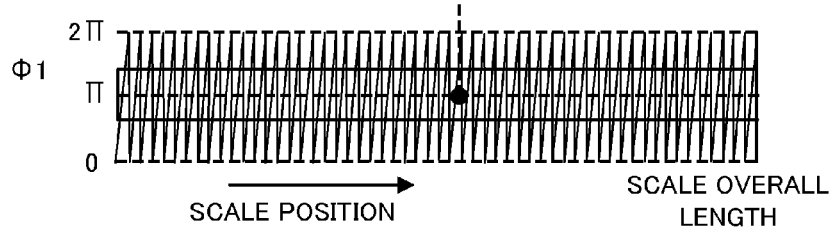

The positional information acquirer 34 in the signal processor 30 converts the amplitude signal S_amp into the position of the scale 20 in the X direction and obtains information of the absolute position of the scale 20 based on the set value stored in the storage 40. FIG. 5B illustrates a relationship between the phase signal Φ1 and the scale position Φ1.

The position signal acquirer of this embodiment obtains the output of the first phase acquirer 32 as the relative position signal (incremental signal). The relative position, as used herein, means a variation amount of the position or a variation direction or amount of the position per unit time or per sampling period (used to obtain the position signal). Alternatively, the relative position may be a variation direction or amount of the position at reference time (when the power is turned on or at predetermined reference timing). Information of which period the scale 20 is located from the measurement starting position when the period is predetermined can be obtained, by counting a change of the relative position signal.

The relationship between the position of the scale 20 in the X direction and the amplitude signal S_amp stored in the storage 40 can be determined by the set value or initialization. In this case, the offset errors and gain ratios contained in S(A) and S(B) that rely upon the offset and gain scatterings of each amplifier may be corrected.

For example, the amplitude ratio is obtained from (maximum value−minimum value)/2 for each of S(A) and S(B) for the predetermined area, and the correction is performed so as to make these amplitudes equal to each other. Similarly, the offset error amount is obtained from (maximum value+minimum value)/2 and the offset is corrected. In either way, the correction amount is stored in the storage 40, read out and used for corrections when the position is obtained.

Thus, information of the absolute position of the scale 20 can be precisely acquired without increasing the size of the detector. The "absolute position," as used herein, means a position of a driver to an apparatus having the driver, and is different from a variation amount of the position to the position at the predetermined reference timing. Once the absolute position) is determined, the position of the driver to the apparatus is uniquely determined. In the apparatus to which the encoder of this embodiment is attached, a scale is arranged onto one of the driver and the fixed or movable unit that does not move with the driver, and a detector array is arranged onto the other. Thereby, the position of the driver having the scale relative to the fixed unit (apparatus body side) having the detector array becomes detectable.

Second Embodiment

A second embodiment is similar to the first embodiment except use of a track 21B illustrated in FIG. 6B instead of the track 21A illustrated in FIG. 2A for the optical absolute encoder illustrated in FIG. 1.

Figure 6:
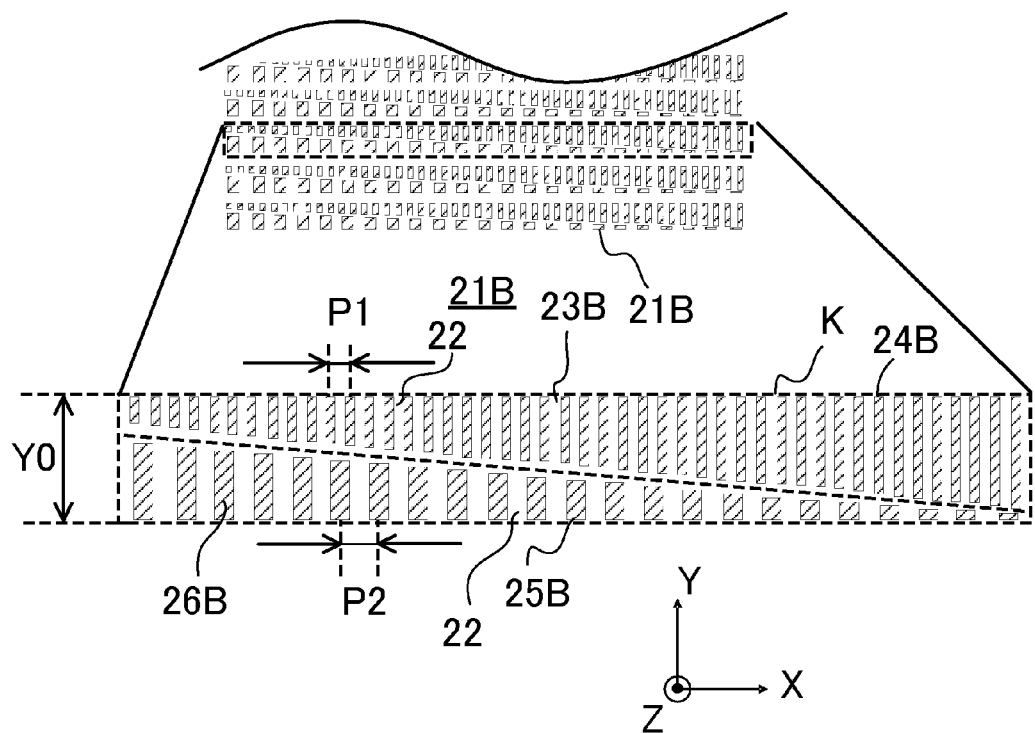
FIG. 6 is a partially enlarged plane view of a track according to the second embodiment.

FIG. 6 is a partially enlarged plane view of the track 21B according to the second embodiment. In the track 21B, two types of areas (23B and 25B) alternate in the Y direction perpendicular to the moving direction (X direction) of the scale 20, and the unit block pattern K has a width Y0 of 50 μm in the Y direction. In FIG. 6, a white portion is the non-reflector 22. A magnified range at the bottom in FIG. 6 corresponds to one track.

The area 23B corresponds to the aforementioned first area, and includes a pattern row having a plurality of rectangular patterns. Each pattern is a reflector 24B that has a width of 50 μm in the X direction, and its length in the Y direction gradually increases in the X direction. A plurality of patterns are arranged at regular intervals of a pitch P1 (=100 μm) in the X direction.

The area 25B corresponds to the aforementioned second area, and includes a pattern row having a plurality of rectangular patterns. Each pattern is a reflector 26B that has a width of 100 μm in the X direction, and its length in the Y direction gradually decreases in the X direction. A plurality of patterns are arranged at regular intervals of a pitch P2 (=200 μm) in the X direction.

Each of the thicknesses of the areas 23B and 25B in the Y direction differs with a position in the X direction. The width of the area 23B in the Y direction linearly increases so that it is 20 μm at one end (with X=0 mm) of the moving range in the X direction and 50 μm at the other end (with X=80.8 mm). The width of the area 25B in the Y direction linearly changes so that it is 30 μm at one end (with X=0 mm) of the moving range in the X direction and 0 μm at the other end (with X=80.8 mm). The width of the reflector 24B in the Y direction is approximately equal to the width of the area 23B in the Y direction, and the width of the reflector 26B in the Y direction is approximately equal to the width of the area 25B in the Y direction.

Similar to the first embodiment, the signal processor 30 obtains the first phase Φ1, the first amplifier amp1, and the second amplifier amp2 using Expressions 3 to 5. Then, the absolute position signal acquirer acquires the amplitude signal S_amp using the following expression instead of Expression 6:

$$S\_amp = (amp1 - amp2)/(amp1 + amp2) \qquad \text{Expression 7}$$

Influences of the fluctuations of the light amount emitted from the light source 12 and the uneven reflective factors caused by the non-uniformity of the reflective films can be reduced by utilizing the ratio of (amp1−amp2)/(amp1+amp2). Since the increasing/decreasing directions of the first amplitude and the second amplitude are opposite to each other with the position in the X direction, a wide variance width of the amplitude signal S_amp can be maintained and the amplitude can be precisely corresponded with the position in the X direction. A relationship between the amplitude signal S_amp and the position of the scale 20 in the X direction is previously stored in the storage 40 as in the first embodiment.

In order to effectively utilize the dynamic range of the detector, a sum signal SUM may be obtained from the following expression, and an LED emitted light amount may be controlled so as to make constant the sum signal SUM:

$$SUM = S(A+) + S(A-) + S(B+) + S(B-) \qquad \text{Expression 8}$$

Since the ratio between the areas of the reflectors 24B, 26B and the non-reflector 22 (or the average energy distribution from the detectable area) is made constant irrespective of the position in the X direction in this embodiment, the emitted light amount of the light source 12 can be used with an approximately constant value and the performance can become easily maintained.

Thus, this embodiment can obtain the absolute position signal more precisely than the first embodiment.

Third Embodiment

Figure 7:
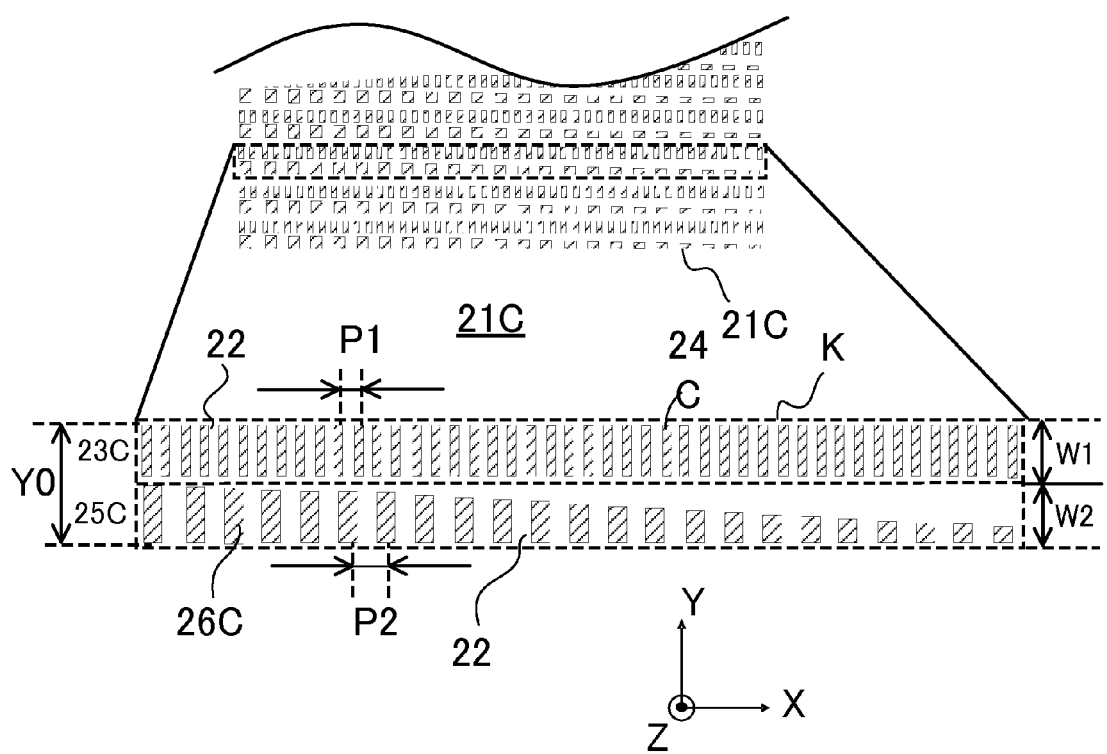
FIG. 7 is a partially enlarged plane view of a track according to a third embodiment.

A third embodiment is similar to the first embodiment except use of a track 21C illustrated in FIG. 7 instead of the track 21A illustrated in FIG. 2.

FIG. 7 is a partially enlarged plane view of the track 21C according to the third embodiment. In the track 21C, two types of areas (23C and 25C) alternate in the Y direction perpendicular to the moving direction (X direction) of the scale 20, and the unit block pattern K has a width Y0 of 50 μm in the Y direction. In FIG. 7, a white portion is a non-reflector 22. A magnified range at the bottom in FIG. 7 corresponds to one track.

The area 23C corresponds to the aforementioned first area, and includes a pattern row having a plurality of patterns having the same rectangular shape. Each pattern is a reflector 24C that has a width of 50 μm in the X direction, and a length of 25 μm in the Y direction. A plurality of patterns are arranged at regular intervals of a pitch P1 (=100 μm) in the X direction. A width of the area 23C in the Y direction is set to W1=25 μm.

The area 25C corresponds to the aforementioned second area, and includes a pattern row having a plurality of rectangular patterns. Each pattern is a reflector 26C that has a width of 101 μm in the X direction, and its length in the Y direction gradually decreases in the X direction. The width of the reflector 26C in the Y direction linearly decreases so that it is 25 μm at one end of the moving range in the X direction (X=0 mm), and 10 μm at the other end (X=80.8 mm). A plurality of patterns are arranged at regular intervals of a pitch P2 (=202 μm) in the X direction. A width of the area 25C in the Y direction is set to W2=25 μm. In this embodiment, a ratio of the pitch between the two areas 23C and 25C slightly differs from the integer times.

A description will now be given of a correction of a signal obtained from the area 25C. Since the detection pitch (of 200 μm) of the light receiving element 17A slightly differs from the patterned period (of 202 μm) of the scale, a relative phase difference may be corrected between the two-phase sine wave signals S(A) and S(B). A description will now be given of a method of correcting a phase difference.

Initially, the two-phase sine wave signals S(A) and S(B) including the relative phase difference error "e" can be expressed as follows:

$$S(A) = \cos(\theta + e/2) \qquad \text{Expression 9}$$

$$S(B) = \sin(\theta - e/2) \qquad \text{Expression 10}$$

Using Expressions 9 and 10, an error component "e" can be separated by an addition and a difference between the two-phase sine wave signals S(A) and S(B) as follows:

$$S(A)+S(B)=2\cdot\cos(\theta-\pi/4)\sin(e/2-\pi/4) \quad \text{Expression 11}$$

$$-S(A)+S(B)=2\cdot\sin(\theta-\pi/4)\cos(e/2-\pi/4) \quad \text{Expression 12}$$

The relative phase difference error "e" can be expressed as $e=(1-200/202)\cdot\pi$ using the set values. By multiplying both sides of Expression 11 by the reciprocal of $2\cdot\sin(e(x)/2-\pi/4)$ and by multiplying both sides of Expression 12 by the reciprocal of $2\cdot\cos(e(x)/2-\pi/4)$ two-phase sine wave signals S(A)' and S(B)' can be calculated as follows in which the phase difference error is corrected where $\phi=\theta-\pi/4$:

$$S(A)'=(S(A)+S(B))/(2\cdot\sin(e/2-\pi/4))=\cos\phi \quad \text{Expression 13}$$

$$S(B)'=(-S(A)+S(B))/(2\cdot\cos(e/2-\pi/4))=\sin\phi \quad \text{Expression 14}$$

The relative phase difference error "e" may be stored through the initialization. For example, the amplitude component $2\cdot\sin(e(x)/2-\pi/4)$ is obtained from (maximum value−minimum value)/2 of S(A)+S(B) in the predetermined range in the X direction, and the amplitude component $2\cdot\cos(e(x)/2-\pi/4)$ is obtained from (maximum value−minimum value)/2 of −S(A)+S(B) in the predetermined range in the X direction. These values may be stored in the storage 40. In this case, it is possible to correct mounting height shifts of the light source 12 and the light receiving element array 16A and the relative inclination between the scale 20 and the sensor.

Thus obtained S(A)' is set to S(A) and S(B)' is set to S(B).

Initially, the signal processor 30 obtains the first phase $\Phi1$ and the first amplitude amp1 using Expressions 3 and 4 and S(A) and S(B) when the input into the switching circuit 18 has a high level.

Similarly, the second phase acquirer 33 of the signal processor 30 obtains the phase $\Phi2$ of the energy distribution for the area 25 using the following expression and S(A) and S(B) when the input into the switching circuit 18 has a low level and: In addition, the second amplitude acquirer 38 of the signal processor 30 obtains the second amplifier amp2 using Expression 5:

$$\Phi2=\text{ATAN2}[S(A),S(B)] \quad \text{Expression 15}$$

Moreover, the absolute position signal acquirer of the position information acquirer 34 in the signal processor 30 obtains the amplitude signal S_amp using Expression 6.

Next, the positional information acquirer 34 in the signal processor 30 obtains the Vernier signal Sv that serves as the absolute position signal, using the following operation:

$$Sv=\Phi1-2\cdot\Phi2 \quad \text{Expression 16}$$

At this time, the signal processor 30 repeats $Sv=Sv+2\pi$ for $Sv<0$ and $Sv=Sv-2\pi$ for $Sv>2\pi$ and converts Sv into an output range between 0 and $2\pi$.

The Vernier signal Sv is not limited to the coefficients of Expression 16. The Vernier signal Sv can be expressed as $Sv=A\cdot\Phi1-B\cdot\Phi2$ where A and B are coefficients that satisfy $A/B=n/m$ using the first modulation period P1 and the second modulation period P2 and integers m and n that satisfy $|(m\cdot P1-n\cdot P2)|<|(P1-P2)|$.

Figure 8A:
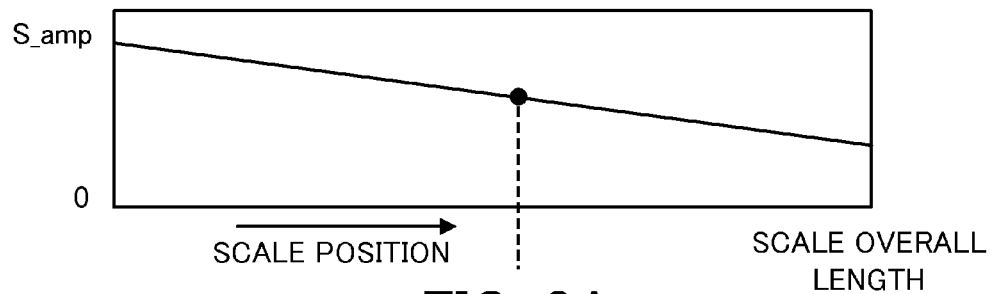
FIGS. 8A to 8C illustrate a relationship among a variety of types of signals and a scale position according to the third embodiment.

FIG. 8A illustrates a relationship between the amplitude signal S_amp and the scale position. The amplitude signal S_amp approximately linearly or monotonously decreases with the scale position.

Figure 8B:
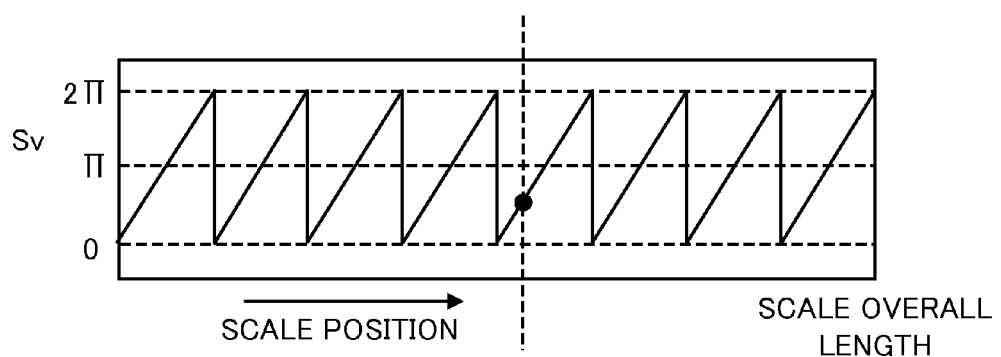

FIG. 8B illustrates a relationship between the Vernier signal Sv and the scale position. The Vernier signal Sv is a periodical signal that has a period of 10.1 mm, and becomes a periodical signal for eight periods for the full stroke 80.8 mm in the X direction.

Instead of obtaining a Vernier signal using differences among phases obtained from a plurality of tracks and light receiving elements, using a difference among a plurality of phase signals obtained from the same light receiving surface can reduce a relative phase difference caused by the sensor's rotating unsteadiness.

Figure 8C:
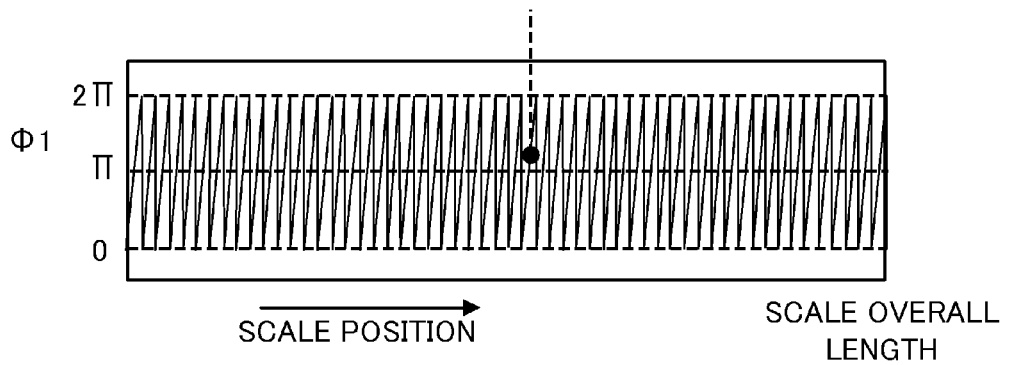

FIG. 8C illustrates a relationship between the phase signal $\Phi1$ and the scale signal.

A description will now be given of processing used to obtain information of the absolute position with the positional information acquirer 34 in the signal processor 30. The signal processor 30 conducts initialization so as to scan the full stroke, and stores in the storage 40 a value S_init of the amplitude signal S_amp at a starting point (X=0 mm) and a value S_end of the amplitude signal S_amp at an end point (X=80.8 mm).

Next, the signal processor 30 obtains a superordinate signal C using the following expression and the values S_init and S_end stored in the storage 40:

$$C=2\pi\cdot(S\_amp-S\_end)/(S\_init-S\_end) \quad \text{Expression 17}$$

Next, the signal processor 30 synchronizes the superordinate signal C with the Vernier signal Sv, calculates, based on the superordinate signal C which period of Sv the current position corresponds to, and obtains an absolute position signal (medium M in the following expression) having positional accuracy of $\Phi b$ by connecting $\Phi b$.

$$M=(2\pi\cdot\text{ROUND}[(FS/Tv\cdot C-Sv)/(2\pi)]+Sv)\cdot Tv/FS \quad \text{Expression 18}$$

Herein, ROUND[x] is a function that converts a value into an integer closest to x. FS is a full stroke in the X direction. Tv is a period of the Vernier signal Sv in the X direction. In this embodiment, FS=80.8 mm, and Tv=10.1 mm.

Next, the signal processor 30 synchronizes the medium M with $\Phi1$, calculates which period of $\Phi1$ the current position is located at, using the medium M, and obtains an absolute position signal ABS having the positional accuracy of $\Phi1$ by connecting $\Phi1$.

$$\text{ABS}=(\text{ROUND}[(FS/P1\cdot M-\Phi1)/(2\pi)]+\Phi1/(2\pi))\cdot P1 \; [\mu m] \quad \text{Expression 19}$$

This embodiment generates the absolute position signal ABS having positional accuracy of $\Phi1$ as a relative position signal, and thus does not require the relative position signal. This embodiment generates the medium M, can easily synchronize the periodic signals with each other, and thus can more precisely obtain the absolute position signal with a longer stroke than the first embodiment.

A similar effect can be obtained when the pitch P2 of the area 25 is set to 202 μm in the scale pattern of the second embodiment.

Fourth Embodiment

Figure 9:
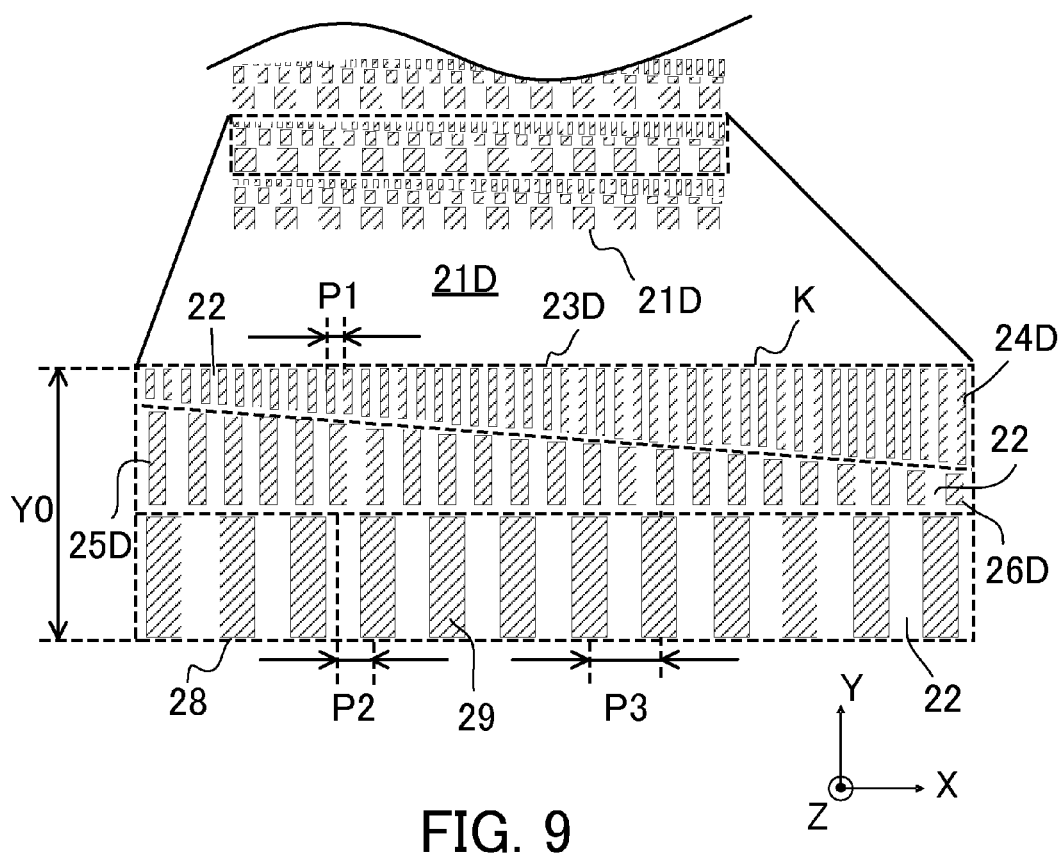
FIG. 9 is a partially enlarged plane view of a track according to a fourth embodiment.
Figure 10:
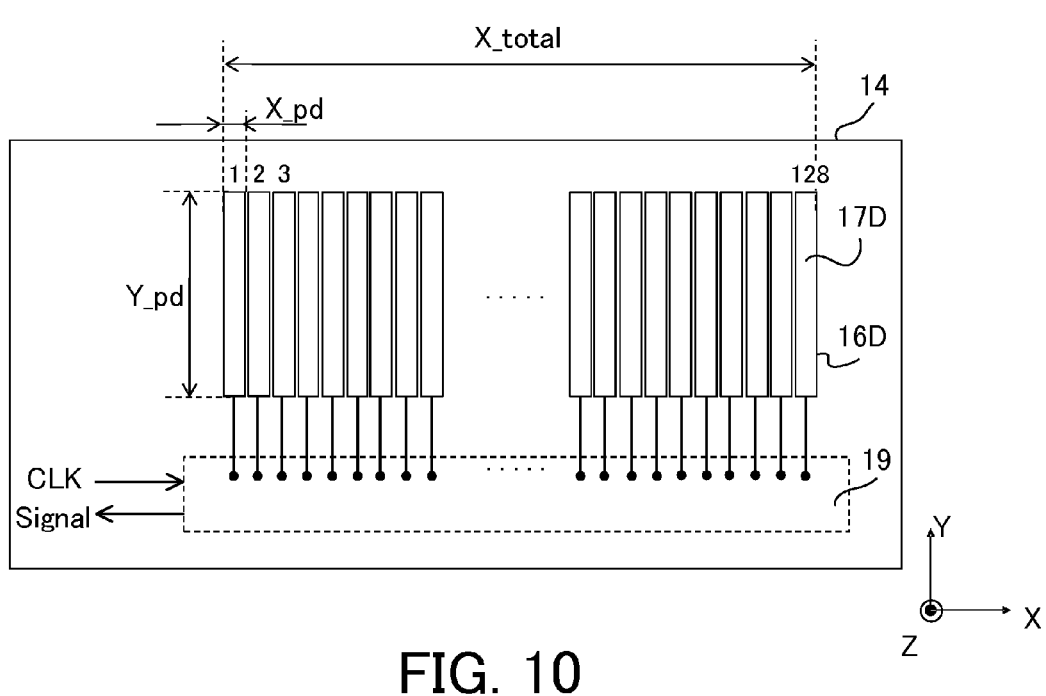
FIG. 10 is a plane view of a light receiving surface of a light receiving element array according to the fourth embodiment.

The fourth embodiment is similar to the first embodiment except use of a track 21D illustrated in FIG. 9 and the light receiving array 16D illustrated in FIG. 10 for the structure of the encoder illustrated in FIG. 1.

FIG. 9 is a partially enlarged plane view of the track 21D according to the fourth embodiment. In the track 21D, three types of areas (23D, 25D, and 28) alternate in the Y direction perpendicular to the moving direction (X direction) of the scale 20, and the unit block pattern K has a width Y0 of 100 μm in the Y direction. In FIG. 9, a white portion is a non-reflector 22. A magnified range at the bottom in FIG. 9 corresponds to one track.

The area 23D corresponds to the aforementioned first area, and includes a pattern row having a plurality of rectangular patterns. Each pattern is a reflector 24D that has a width of 50 μm in the X direction, and its length in the Y direction gradually increases in the X direction. A plurality of patterns are arranged at regular intervals of a pitch P1 (=100 μm) in the X direction.

The area 25D corresponds to the aforementioned second area, and includes a pattern row having a plurality of rectangular patterns. Each pattern is a reflector 26D that has a width of 101 μm in the X direction, and its length in the Y direction gradually decreases in the X direction. A plurality of patterns are arranged at regular intervals of a pitch P2 (=202 μm) in the X direction.

The area 28 includes a pattern row having a plurality of patterns having the same rectangular shape. Each pattern is a reflector 29 that has a width of 200 μm in the X direction, and a length of 50 μm in the Y direction. A plurality of patterns are arranged at regular intervals of a pitch P3 (=400 μm) in the X direction.

The width in the Y direction of the region that contains the areas 23D and 25D is 50 μm. The width in the Y direction of each of the areas 23D and 25D differs with the position in the X direction. The width of the area 23D in the Y direction linearly increases with the position in the X direction so that it is 15 μm at one end (X=0 mm) of the moving range in the X direction and 35 μm at the other end (X=80.8 mm). The width of the area 25D in the Y direction linearly decreases with the position in the X direction so that it is 35 μm at one end (X=0 mm) of the moving range in the X direction and 15 μm at the other end (X=80.8 mm).

The width of the reflector 24D in the Y direction is approximately equal to the width of the area 23D in the Y direction. The width of the reflector 26D in the Y direction is approximately equal to the width of the area 25D in the Y direction. The width of the reflector 29 in the Y direction is equal to the width of the area 28 in the Y direction.

FIG. 10 is a plane view of a light receiving surface of the light receiving element array 16D according to the fourth embodiment which is applicable to the light receiving element array 16 illustrated in FIG. 1. The light receiving element array 16D is a so-called linear sensor array configured to sequentially take an output corresponding to a light receiving amount of each light receiving element 17D in synchronization with the clock timing.

In the light receiving element array 16D, 128 light receiving elements 17D are arranged in the X direction with a pitch X_pd of 12.5 μm. Its width Y_pd in the Y direction is 800 μm, and the overall width X_total in the X direction is 1,600 μm.

Since a projected pattern on the scale is magnified twice, the detectable range on the scale is 400 μm in the Y direction and 800 μm in the X direction. Therefore, the detectable range on the scale contains the areas 23D, 25D, and 28 four lines each in the Y direction.

A method for separating each periodical signal component of each of the areas 23, 25, and 28 from a linear image signal V output from an output unit 19 of the light receiving element array 16D may use a fast Fourier transformation ("FFT") or a conversion into four-phase sine waves corresponding to each period, as in the first embodiment.

$\Phi 1$ denotes a first phase of the thus obtained signal corresponding to the area 23D (with a period P1=100 μm), and amp1 denotes the first amplitude. $\Phi 2$ denotes a second phase of the signal corresponding to the area 25D (with a period P2=202 μm), and amp2 denotes the second amplitude. $\Phi 3$ denotes a third phase of the signal corresponding to the area 28 (with a period P3=400 μm), and amp3 denotes the third amplitude. The initial phases of these three periodic patterns on the scale 20 are set so that $\Phi 1 = \Phi 2 = \Phi 3 = 0$ at one end of the moving range (X=0 mm).

Next, the signal processor 30 obtains the amplitude signal S_amp from the following expression:

$$S\_amp = (amp1 - amp2)/amp3 \quad \text{Expression 20}$$

The signal processor 30 obtains the Vernier signal Sv from Expression 16, repeats Sv=Sv+2π for Sv<0 and Sv=Sv−2π for Sv>2π, and converts Sv into an output range between 0 and 2π.

Since the Vernier signal Sv is a periodic signal having a period of 10.1 mm, its full stroke 80.8 mm in the X direction corresponds to the periodic signal for eight periods.

Instead of obtaining a Vernier signal using differences among phases obtained from each of a plurality of tracks and light receiving elements, using a difference among a plurality of phase signals obtained from the same light receiving surface can reduce a relative phase difference caused by the sensor's rotating unsteadiness.

Next, similar to the third embodiment, the signal processor 30 obtains the superordinate signal C using Expression 17 and medium M using Expression 18.

Next, the signal processor 30 synchronizes the medium M with $\Phi 3$, calculates which period of Sv the current position corresponds to, from the medium M, and obtains a subordinate signal F having positional accuracy of $\Phi 3$ by connecting $\Phi 3$.

$$F = (2\pi \times \text{ROUND}[(FS/P3 \times M - \Phi 3)/(2\pi)] + \Phi 3) \times P3/FS \quad \text{Expression 21}$$

The medium signal has higher sensitivity and higher precision (in phase or position) than the superordinate signal, and the subordinate signal has higher sensitivity and higher precision than the medium signal.

Next, the signal processor 30 synchronizes the subordinate signal F with $\Phi 1$, calculates which period of the current position is located, based on the subordinate signal F, and obtains an absolute position signal ABS having positional accuracy of $\Phi 1$ by connecting $\Phi 1$.

$$\text{ABS} = (\text{ROUND}[(FS/P1 \times F - \Phi 1)/(2\pi)] + \Phi 1/(2\pi)) \times P1 \, [\mu m] \quad \text{EXPRESSION 22}$$

This embodiment generates the medium M and the subordinate signal F, can easily synchronize the periodic signals with each other, and thus can more precisely obtain the absolute position signal with a longer stroke than the first embodiment.

While this embodiment illustrates an optical encoder, a magnetic encoder and an electrostatic encoder can be also exhibit similar effects. In case of the magnetic encoder, a magnetic material is utilized for the scale 20, and a magnetic polarity distribution is formed with a shape similar to the reflective film of the scale 20 of this embodiment. A magnetic field detector array is arranged closely to this scale for detections. In the electrostatic type, a conductive electrode pattern is formed in a shape similar to the scale reflective film of this embodiment, and another electrode pattern array is closely opposed for detections.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a position detecting apparatus including the encoder of the present invention. This encoder includes a movable unit, and the encoder configured to detect a position of the movable unit. The position of the movable unit can be precisely detected by providing the scale to the movable unit and the light source and the (photo-) detector to the fixed unit in the position detecting apparatus. The present invention is also applicable to an optical apparatus that includes a lens apparatus and an image-pickup apparatus. The optical apparatus includes an optical system that includes a movable optical unit, and the encoder of the present invention configured to detect a position of the movable optical unit. The movable optical unit includes a zoom lens unit that is movable during zooming, a focusing lens unit that is movable during focusing, or a stop that is driven when the light amount is adjusted. In the optical apparatus to which the present invention is applied, the position of the zoom lens unit or the focusing lens unit can be detected by providing the (photo-)detector to the fixed unit that is not moved during zooming or focusing. Similarly, when the encoder of the present invention is applied to an apparatus, such as a facsimile machine, a printer, and a copier, configured to output or input a sheet of paper, the encoder of this embodiment can detect a position of the movable unit in the paper carrying system in the apparatus. When the encoder of the present invention is applied to a manufacturing apparatus used for a factory, such as a processing machine or a belt conveyor, the encoder of this embodiment can detect a position of a movable unit, such as a stage, a tool, or a belt in the manufacturing apparatus body. In the other apparatus that includes a movable object or unit, the encoder of this embodiment can detect a position of the movable object.

This application claims the benefit of Japanese Patent Application No. 2011-089728, filed Apr. 14, 2011, which is hereby incorporated by reference herein in its entirety.

What is claimed is:

1. An encoder comprising:
    a scale that includes a first pattern row having a plurality of patterns arranged in a moving direction in a first modulation period and a second pattern row having a plurality of patterns arranged in the moving direction in a second modulation period different from the first modulation period, the first and second pattern rows being configured to spatially modulate an energy distribution;
    a detector array that includes a plurality of detectors that are configured to detect the energy distribution from the first and second pattern rows and arranged in the moving direction; and
    a signal processor configured to process and convert into positional information, an output signal from the detector array,
    wherein the scale and the detector array are configured to move relatively with each other,
    wherein the first pattern row is configured such that an amplitude of the energy distribution which the detector array detects based on the first pattern row changes with a position of the scale in the moving direction,
    wherein the signal processor includes:
    a plurality of amplitude acquirers each configured to acquire the amplitude of the energy distribution corresponding to the first and second pattern rows based on the output signal from the detector array; and
    a positional information acquirer configured to acquire a position signal representing the position of the scale using an amplitude signal obtained by normalizing a plurality of amplitudes obtained by the plurality of amplitude acquirers, and
    wherein each of the first and second pattern rows is periodically arranged in a direction perpendicular to the moving direction, the amplitude of the energy distribution for at least one of the first and second pattern rows being configured to change with the position of the scale in the moving direction.

2. The encoder according to claim 1, wherein the signal processor further includes a first phase acquire configured to acquire a first phase of a first modulation period based on the output signal from the detector array, and
    wherein the positional information acquirer utilizes the first phase acquired by the first acquirer as a relative position signal representative of a relative position of the scale.

3. The encoder according to claim 2, wherein the signal processor acquires an absolute position of the scale by synchronizing the position signal with the first phase acquired by the first phase acquirer.

4. The encoder according to claim 1, wherein the signal processor further includes a signal separator configured to separate the output signal from the detector array into a signal corresponding to each area of the pattern row, by switching an electrically added interval of the plurality of detector.

5. The encoder according to claim 1, wherein the encoder is an absolute encoder configured to detect the energy distribution from each of the first and second pattern rows by switching outputs of the plurality of detectors so as to switch a detectable period for each of the first and second modulation periods.

6. The encoder according to claim 1, wherein in the first and second pattern rows, the amplitude of the energy distribution changes with the position of the scale in the moving direction, and an increasing direction of the amplitude is opposite between the first pattern row and the second pattern row.

7. The encoder according to claim 6, wherein an average energy distribution from a detectable area of the scale corresponding to a detectable range of the detector array is constant irrespective of the position of the scale in the moving direction.

8. A position detecting apparatus comprising:
    a movable unit; and
    an encoder configured to detect a position of the movable unit,
    wherein the encoder includes:
    a scale that includes a first pattern row having a plurality of patterns arranged in a moving direction in a first modulation period and a second pattern row having a plurality of patterns arranged in the moving direction in a second modulation period different from the first modulation period, the first and second pattern rows being configured to spatially modulate an energy distribution;
    a detector array that includes a plurality of detectors that are configured to detect the energy distribution from the first and second pattern rows and arranged in the moving direction; and
    a signal processor configured to process and convert into positional information, an output signal from the detector array,
    wherein the scale and the detector array are configured to move relatively with each other,
    wherein the first pattern row is configured such that an amplitude of the energy distribution which the detector array detects based on the first pattern row with a position of the scale in the moving direction,
    wherein the signal processor includes:
    a plurality of amplitude acquirers each configured to acquire the amplitude of the energy distribution corresponding to the first and second pattern rows based on the output signal from the detector array; and

15 a positional information acquirer configured to acquire a position signal representing the position of the scale using an amplitude signal obtained by normalizing a plurality of amplitudes obtained by the plurality of amplitudes acquirers, and wherein each of the first and second pattern rows is periodically arranged in a direction perpendicular to the moving direction, the amplitude of the energy distribution for at least one of the first and second pattern rows being configured to change with the position of the scale in the moving direction.

9. An optical apparatus comprising:
an optical system that includes a movable optical unit; and
an encoder configured to detect a position of the movable optical unit,
wherein the encoder includes:
a scale that includes a first pattern row having a plurality of patterns arranged in a moving direction in a first modulation period and a second pattern row having a plurality of patterns arranged in the moving direction in a second modulation period different from the first modulation period, the first and second pattern rows being configured to spatially modulate an energy distribution;
a detector array that includes a plurality of detectors that are configured to detect the energy distribution from the first and second pattern row and arranged in a moving direction; and
a signal processor configured to process and convert into positional information, an output signal from the detector array,
wherein the scale and the detector array are configured to move relatively with each other,
wherein the first pattern row is configured such that an amplitude of the energy distribution which the detector array detects based on the first patter row changes with a position of the scale in the moving direction,
wherein the signal processor includes:
a plurality of amplitude acquirers each configured to acquire the amplitude of the energy distribution corresponding to the first and second pattern rows based on output signal from the detector array;
a positional information acquirer configured to acquire a position signal representing the position of the scale using an amplitude signal obtained by normalizing a plurality of amplitudes obtained by the plurality of amplitude acquirers, and
wherein each of the first and second pattern rows is periodically arranged in a direction perpendicular to the moving direction, the amplitude of the energy distribution for at least one of the first and second pattern rows being configured to change the position of the scale in the moving direction.

10. An encoder comprising:
a photodetector array that includes a plurality of photodetectors arranged in a moving direction;
a scale that includes a first pattern row having a plurality of patterns arranged in the moving direction in a first period and introducing light from a light source to the photodetector array by reflecting or transmitting the light and a second pattern row having a plurality of patterns arranged in the moving direction in a second period different from the first period and introducing the light from the light source to the photodetector array by reflecting or transmitting the light; and
a signal processor configured to process an output signal from the photodetector array to acquire positional information,

16 wherein the photodetector array and the scale are configured to move relatively with each other in the moving direction,
wherein the first pattern row is configured so that an amplitude of change, in light quantity introduced into the photodetector array via the first pattern row, to a relative position between the photodetector array and the scale in the moving direction varies according to the relative position, and
wherein the signal processor is configured to acquire the positional information by using an amplitude signal obtained by performing normalization processing of a plurality of amplitudes including an amplitude of change in light quantity corresponding to the first pattern row and an amplitude of change in light quantity corresponding to the second pattern row.

11. A position detecting apparatus comprising:
a movable unit; and
an encoder configured to detect a position of the movable unit,
wherein the encoder includes:
a photodetector array that includes a plurality of photodetectors arranged in a moving direction;
a scale that includes a first pattern row having a plurality of patterns arranged in the moving direction in a first period and introducing light from a light source to the photodetector array by reflecting or transmitting the light and a second pattern row having a plurality of patterns arranged in the moving direction in a second period different from the first period and introducing the light from the light source to the photodetector array by reflecting or transmitting the light; and
a signal processor configured to process an output signal from the photodetector array to acquire positional information,
wherein the photodetector array and the scale are configured to move relatively with each other in the moving direction,
wherein the first pattern row is configured so that an amplitude of change, in light quantity introduced into the photodetector array via the first pattern row, to a relative position between the photodetector array and the scale in the moving direction varies according to the relative position, and
wherein the signal processor is configured to acquire the positional information by using an amplitude signal obtained by performing normalization processing of a plurality of amplitudes including an amplitude of change in light quantity corresponding to the first pattern row and an amplitude of change in light quantity corresponding to the second pattern row.

12. An optical apparatus comprising:
an optical system that includes a movable optical unit; and
an encoder configured to detect a position of the movable optical unit,
wherein the encoder includes:
a photodetector array that includes a plurality of photodetectors arranged in a moving direction;
a scale that includes a first pattern row having a plurality of patterns arranged in the moving direction in a first period and introducing light from a light source to the photodetector array by reflecting or transmitting the light and a second pattern row having a plurality of patterns arranged in the moving direction in a second period different from the first period and introducing the light from the light source to the photodetector array by reflecting or transmitting the light; and a signal processor configured to process an output signal from the photodetector array to acquire positional information, wherein the photodetector array and the scale are configured to move relatively with each other in the moving direction, wherein the first pattern row is configured so that an amplitude of change, in light quantity introduced into the photodetector array via the first pattern row, to a relative position between the photodetector array and the scale in the moving direction varies according to the relative position, and wherein the signal processor is configured to acquire the positional information by using an amplitude signal obtained by performing normalization processing of a plurality of amplitudes including an amplitude of change in light quantity corresponding to the first pattern row and an amplitude of change in light quantity corresponding to the second pattern row.

13. An encoder comprising:

a detector array that is arranged in a moving direction and includes a plurality of detectors that are configured to detect energy intensity;

a scale that includes a first pattern row that changes the energy intensity detected by the detector array in a first period according to change in a position relative to the detector array in the moving direction and a second pattern row that changes the energy intensity detected by the detector array in a second period different from the first period according to change in a position relative to the detector array in the moving direction; and a signal processor configured to process an output signal from the detector array to acquire positional information, wherein the detector array and the scale are configured to move relatively with each other in the moving direction, wherein the first pattern row is configured so that an amplitude of change, in energy detected by the detector array based on the first pattern row, to a relative position between the detector array and the scale in the moving direction varies according to the relative position, and wherein the signal processor is configured to acquire the positional information by using an amplitude signal obtained by performing normalization processing of a plurality of amplitudes including an amplitude of change in energy corresponding to the first pattern row and an amplitude of change in energy corresponding to the second pattern row.

14. A position detecting apparatus comprising:

a movable unit; and an encoder configured to detect a position of the movable unit, wherein the encoder includes:

a detector array that is arranged in a moving direction and includes a plurality of detectors that are configured to detect energy intensity;

a scale that includes a first pattern row that changes the energy intensity detected by the detector array in a first period according to change in a position relative to the detector array in the moving direction and a second pattern row that changes the energy intensity detected by the detector array in a second period different from the first period according to change in a position relative to the detector array in the moving direction; and a signal processor configured to process an output signal from the detector array to acquire positional information, wherein the detector array and the scale are configured to move relatively with each other in the moving direction, wherein the first pattern row is configured so that an amplitude of change, in energy detected by the detector array based on the first pattern row, to a relative position between the detector array and the scale in the moving direction varies according to the relative position, and wherein the signal processor is configured to acquire the positional information by using an amplitude signal obtained by performing normalization processing of a plurality of amplitudes including an amplitude of change in energy corresponding to the first pattern row and an amplitude of change in energy corresponding to the second pattern row.

15. An optical apparatus comprising:

an optical system that includes a movable optical unit; and an encoder configured to detect a position of the movable optical unit, wherein the encoder includes:

a detector array that is arranged in a moving direction and includes a plurality of detectors that are configured to detect energy intensity;

a scale that includes a first pattern row that changes the energy intensity detected by the detector array in a first period according to change in a position relative to the detector array in the moving direction and a second pattern row that changes the energy intensity detected by the detector array in a second period different from the first period according to change in a position relative to the detector array in the moving direction; and a signal processor configured to process an output signal from the detector array to acquire positional information, wherein the detector array and the scale are configured to move relatively with each other in the moving direction, wherein the first pattern row is configured so that an amplitude of change, in energy detected by the detector array based on the first pattern row, to a relative position between the detector array and the scale in the moving direction varies according to the relative position, and wherein the signal processor is configured to acquire the positional information by using an amplitude signal obtained by performing normalization processing of a plurality of amplitudes including an amplitude of change in energy corresponding to the first pattern row and an amplitude of change in energy corresponding to the second pattern row.

* * * * *